United States Patent
Yan

(10) Patent No.: US 11,316,256 B2
(45) Date of Patent: Apr. 26, 2022

(54) ANTENNA MODULE AND MOBILE TERMINAL

(71) Applicant: AAC Technologies Pte. Ltd., Singapore (SG)

(72) Inventor: Wei Yan, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/995,730

(22) Filed: Aug. 17, 2020

(65) Prior Publication Data
US 2020/0411958 A1    Dec. 31, 2020

Related U.S. Application Data

(63) Continuation of application No. PCT/CN2019/093965, filed on Jun. 29, 2019.

(51) Int. Cl.
| | |
|---|---|
| *H01Q 1/24* | (2006.01) |
| *H01Q 5/307* | (2015.01) |
| *H01Q 5/20* | (2015.01) |
| *H04B 7/0413* | (2017.01) |
| *H04M 1/02* | (2006.01) |

(52) U.S. Cl.
CPC ............. *H01Q 1/243* (2013.01); *H01Q 5/20* (2015.01); *H01Q 5/307* (2015.01); *H04B 7/0413* (2013.01); *H04M 1/026* (2013.01)

(58) Field of Classification Search
CPC .......... H01Q 1/243; H01Q 21/28; H01Q 5/20; H01Q 5/307; H04B 7/04; H04B 7/0413; H04M 1/026

USPC ................. 455/562.1, 575.1, 575.7; 343/800
See application file for complete search history.

(56) References Cited

U.S. PATENT DOCUMENTS

| | | | | |
|---|---|---|---|---|
| 2018/0199148 | A1* | 7/2018 | Park | H04W 4/80 |
| 2018/0205146 | A1* | 7/2018 | Huang | H01Q 9/42 |
| 2018/0294547 | A1* | 10/2018 | Park | H04B 7/0802 |
| 2018/0334112 | A1* | 11/2018 | Sung | E05B 19/0082 |
| 2019/0148830 | A1* | 5/2019 | Tsai | H01Q 9/40 343/800 |
| 2019/0165468 | A1* | 5/2019 | Xu | H01Q 15/0086 |
| 2019/0229413 | A1* | 7/2019 | Jong | H01Q 1/38 |
| 2019/0348749 | A1* | 11/2019 | Thai | H01Q 1/243 |
| 2020/0076488 | A1* | 3/2020 | Brunel | H04B 7/0695 |

* cited by examiner

*Primary Examiner* — Tan H Trinh
(74) *Attorney, Agent, or Firm* — W&G Law Group

(57) ABSTRACT

An antenna module and a mobile terminal are provided. The mobile terminal is provided with a housing. The antenna module includes a first antenna group, a second antenna group, a third antenna group and a fourth antenna group. The first antenna group includes a first antenna and a second antenna, where both the first antenna and the second antenna operate in a 4G frequency band. The second antenna group includes a third antenna and a fourth antenna, where both the third antenna and the fourth antenna operate in a 5G frequency band. The third antenna group includes a fifth antenna, and the fifth antenna operates in the 4G frequency band. The fourth antenna group includes a sixth antenna and a seventh antenna, where both the sixth antenna and the seventh antenna operate in the 5G frequency band. The third, fourth, sixth and seventh antenna form a 4*4MIMO antenna group.

9 Claims, 8 Drawing Sheets

ANTENNA MODULE AND MOBILE TERMINAL

TECHNICAL FIELD

The present disclosure relates to the field of communication technology, in particular to an antenna module and a mobile terminal.

BACKGROUND

With the coming of the 5G era, how to design an antenna module of a mobile terminal so that a communication frequency band of the mobile terminal can meet an existing 4G frequency band while being compatible with a sub-6 GHz frequency band, so as to make communication performance of the mobile terminal better, is a technical problem to be solved urgently by those skilled in the art.

SUMMARY

The present disclosure provides an antenna module and a mobile terminal, aiming to enable a communication frequency band of the mobile terminal to meet an existing 4G frequency band while being compatible with a sub-6 GHz frequency band.

In order to achieve the above objective, the present disclosure provides an antenna module. The antenna module is applied to a mobile terminal. The mobile terminal is provided with a housing. The antenna module includes a first antenna group, a second antenna group, a third antenna group and a fourth antenna group; the first antenna group and the third antenna group are respectively arranged on opposite sides of the housing in a first direction; the second antenna group and the fourth antenna group are respectively arranged on opposite sides of the housing in a second direction, and the first direction and the second direction are perpendicular to each other; the first antenna group includes a first antenna and a second antenna, where both the first antenna and the second antenna operate in a 4G frequency band; the second antenna group includes a third antenna and a fourth antenna, where both the third antenna and the fourth antenna operate in a 5G frequency band; the third antenna group includes a fifth antenna, and the fifth antenna operates in the 4G frequency band; the fourth antenna group includes a sixth antenna and a seventh antenna, where both the sixth antenna and the seventh antenna operate in the 5G frequency band; and the third antenna, the fourth antenna, the sixth antenna and the seventh antenna form a 4*4MIMO antenna group.

As an improvement, an operating frequency band of the first antenna is 1.55~1.650 GHz, 2.4~2.5 GHz and 5.1~55.85 GHz; an operating frequency band of the second antenna is 0.824~0.96 GHz and 1.7~12.69 GHz; operating frequency bands of the third antenna, the fourth antenna, the sixth antenna and the seventh antenna are all 2.515~2.675 GHz, 3.4~3.6 GHz and 4.8~4.9 GHz; and an operating frequency band of the fifth antenna is 0.824~0.96 GHz and 1.71~2.69 GHz.

As an improvement, one of the first antenna group and the third antenna group is arranged on a top of the housing and the other is arranged on a bottom of the housing; the third antenna and the fourth antenna are arranged on one side of the housing at intervals, and the sixth antenna and the seventh antenna are arranged on the other side of the housing at intervals.

In order to achieve the above objective, the present disclosure provides a mobile terminal. The mobile terminal includes a housing and the antenna module described above.

As an improvement, the second antenna group and the fourth antenna group are arranged on an inner surface of the housing.

As an improvement, the mobile terminal further includes a bracket arranged in the housing, and the second antenna group and the fourth antenna group are arranged on the bracket.

As an improvement, the mobile terminal further includes a bracket arranged in the housing, and a part of antennas in the second antenna group and the fourth antenna group are arranged on the bracket, and the other part of the antennas are arranged on the inner surface of the housing.

Compared with the existing technology, the antenna module and the mobile terminal provided in the present disclosure have the following advantages.

1. The antenna module is provided with the first antenna group, the second antenna group, the third antenna group and the fourth antenna group; the first antenna group and the third antenna group are respectively arranged on opposite sides of the housing in the first direction; the second antenna group and the fourth antenna group are respectively arranged on opposite sides of the housing in the second direction, and the first direction and the second direction are perpendicular to each other; the first antenna group includes the first antenna and the second antenna, where both the first antenna and the second antenna operate in the 4G frequency band; the second antenna group includes the third antenna and the fourth antenna, where both the third antenna and the fourth antenna operate in the 5G frequency band; the third antenna group includes the fifth antenna, and the fifth antenna operates in the 4G frequency band; the fourth antenna group includes the sixth antenna and the seventh antenna, where both the sixth antenna and the seventh antenna operate in the 5G frequency band; and the third antenna, the fourth antenna, the sixth antenna and the seventh antenna form the 4*4M1M0 antenna group, thereby realizing compatibility of the sub-6 GHz frequency band on the basis that the antenna module does not affect the 4G frequency band, which makes communication performance of the mobile terminal better.

DETAILED DESCRIPTION

In order to make objectives, technical solutions and advantages of the present disclosure clearer, the present disclosure will be explained below in detail with reference to the accompanying drawings and embodiments. It should be understood that the specific embodiments described here are only used to explain but not to limit the present disclosure.

Figure 1:
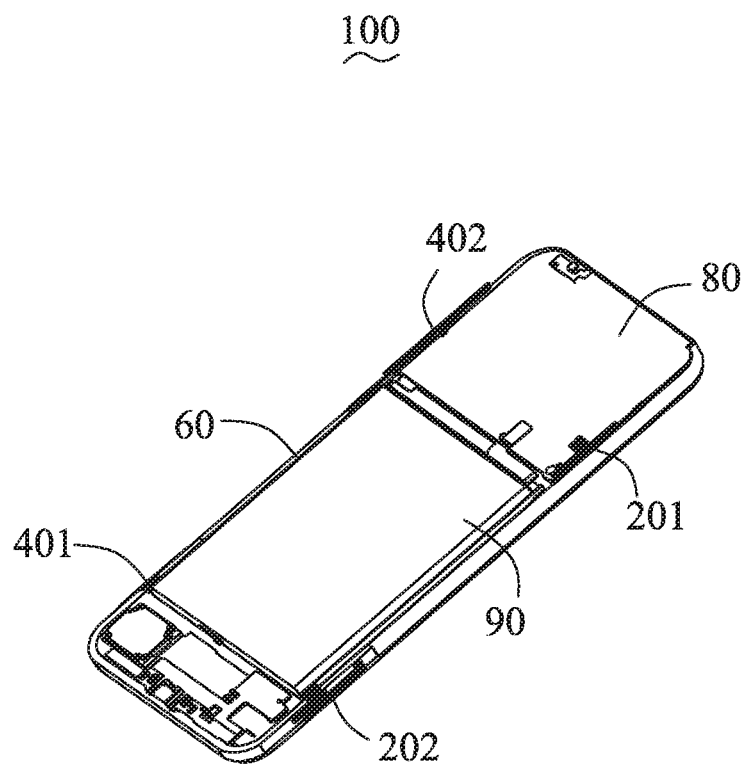
FIG. 1 is a schematic structural diagram of a mobile terminal provided in the present disclosure.
Figure 2:
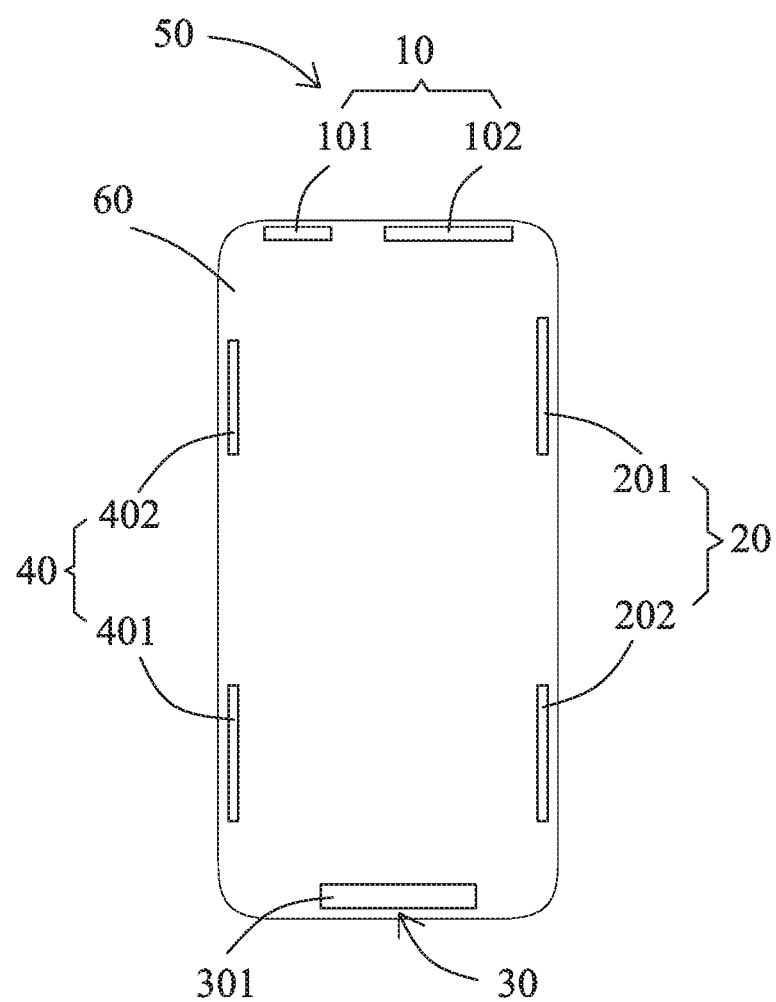
FIG. 2 is a schematic diagram of a structural layout of an antenna module on a housing of the mobile terminal.

Referring to FIG. 1 to FIG. 2, the present disclosure provides a mobile terminal 100. The mobile terminal 100 may be a mobile phone, a tablet computer, a multimedia player, and the like. For convenience of understanding, the following embodiments are described by taking the mobile terminal as the mobile phone as an example.

The mobile terminal 100 includes an antenna module 50, a housing 60, a main board 80 and a battery 90. Herein, the main board 80 is disposed in the housing 60, and both the antenna module 50 and the battery 90 are electrically connected to the main board 80.

Referring to FIG. 2, the antenna module 50 includes a first antenna group 10, a second antenna group 20, a third antenna group 30 and a fourth antenna group 40.

The first antenna group 10 and the third antenna group 30 are respectively arranged on opposite sides of the housing 60 in a first direction. The second antenna group 20 and the fourth antenna group 40 are respectively arranged on opposite sides of the housing 60 in a second direction, and the first direction and the second direction are perpendicular to each other.

The first antenna group 10 includes a first antenna 101 and a second antenna 102, and both the first antenna 101 and the second antenna 102 operate in a 4G frequency band. The second antenna group 20 includes a third antenna 201 and a fourth antenna 202, and both the third antenna 201 and the fourth antenna 202 operate in a 5G frequency band. The third antenna group 30 includes a fifth antenna 301, and the fifth antenna 301 operates in the 4G frequency band. The fourth antenna group 40 includes a sixth antenna 401 and a seventh antenna 402, and both the sixth antenna 401 and the seventh antenna 402 operate in the 5G frequency band. And the third antenna 201, the fourth antenna 202, the sixth antenna 401 and the seventh antenna 402 form a 4*4MIMO antenna group.

Herein, the second antenna group 20 and the fourth antenna group 40 are arranged on an inner surface of the housing 60, but the second antenna group 20 and the fourth antenna group 40 are not limited to be arranged on the inner surface of the housing 60.

By arranging antennas of the 4G operating frequency band and 5G operating frequency band in the mobile terminal 100 in an orderly manner, a coverage of the mobile terminal 100 in the 4G operating frequency band and 5G operating frequency band may be realized. At the same time, the third antenna 201, the fourth antenna 202, and the sixth antenna 401 and the seventh antenna 402 form the 4*4 MIMO antenna group, so that the mobile terminal 100 has good reception and transmission of corresponding frequency band signals.

In some embodiments, an operating frequency band of the first antenna 101 is 1.55~1.650 GHz, 2.4~2.5 GHz and 5.15~5.85 GHz, and an operating frequency band of the second antenna 102 is 0.824~0.96 GHz and 1.71~2.69 GHz.

Operating frequency bands of the third antenna 201, the fourth antenna 202, the sixth antenna 401 and the seventh antenna 402 are all 2.515~2.675 GHz, 3.4~3.6 GHz and 4.8~4.9 GHz.

An operating frequency band of the fifth antenna 301 is 0.824~0.96 GHz and 1.71~2.69 GHz.

Referring to FIG. 2 again, one of the first antenna group 10 and the third antenna group 30 is arranged on a top of the housing 60, and the other is arranged on a bottom of the housing 60. The third antenna 201 and the fourth antenna 202 are arranged on one side of the housing 60 at intervals, and the sixth antenna 401 and the seventh antenna 402 are arranged on the other side of the housing 60 at intervals.

In some embodiments, the first antenna group 10 is arranged on the top of the housing 60, and the fifth antenna 301 is arranged on the bottom of the housing 60.

Specifically, the first antenna 101 of the first antenna group 10 is arranged adjacent to the seventh antenna 402. The second antenna 102 is arranged adjacent to the third antenna 201. The seventh antenna 402 is arranged corresponding to the third antenna 201, and both the seventh antenna 402 and the third antenna 201 are adjacent to the top of the housing 60. The fourth antenna 202 is arranged corresponding to the sixth antenna 401, and both the fourth antenna 202 and the sixth antenna 401 are adjacent to the bottom of the housing 60. The third antenna 201 and the fourth antenna 202 are arranged on one side of the housing 60 at intervals. The sixth antenna 401 and the fourth antenna 402 are arranged on the other side of the housing 60 at intervals.

In some embodiments, the positions of the first antenna 101 and the second antenna 102 may be interchanged. That is, the first antenna 101 is arranged adjacent to the third antenna 201; the second antenna 102 is arranged adjacent to the seventh antenna 402; the seventh antenna 402 is arranged corresponding to the third antenna 201, and both the seventh antenna 402 and the third antenna 201 are adjacent to the top of the housing 60; and the fourth antenna 202 is arranged corresponding to the sixth antenna 401, and both the fourth antenna 202 and the sixth antenna 401 are adjacent to the bottom of the housing 60.

In some embodiments, the first antenna 101 and the second antenna 102 of the first antenna group 10 are both arranged on the bottom of the housing 60, and the fifth antenna 301 is arranged on the top of the housing 60.

Specifically, the first antenna 101 of the first antenna group 10 is arranged adjacent to the sixth antenna 401. The second antenna 102 is arranged adjacent to the fourth antenna 202. The seventh antenna 402 is arranged corresponding to the third antenna 201, and both the seventh antenna 402 and the third antenna 201 are adjacent to the top of the housing 60. The fourth antenna 202 is arranged corresponding to the sixth antenna 401, and both the fourth antenna 202 and the sixth antenna 401 are adjacent to the bottom of the housing 60. The third antenna 201 and the fourth antenna 202 are arranged on one side of the housing 60 at intervals. The sixth antenna 401 and the fourth antenna 402 are arranged on the other side of the housing 60 at intervals.

In some embodiments, the positions of the first antenna 101 and the second antenna 102 may be interchanged. That is, the first antenna 101 of the first antenna group 10 is arranged adjacent to the fourth antenna 202, the second antenna 102 is arranged adjacent to the sixth antenna 401, the sixth antenna 401 is arranged corresponding to the fourth antenna 202, and the third antenna 201 is arranged corresponding to the seventh antenna 402.

Figure 3:
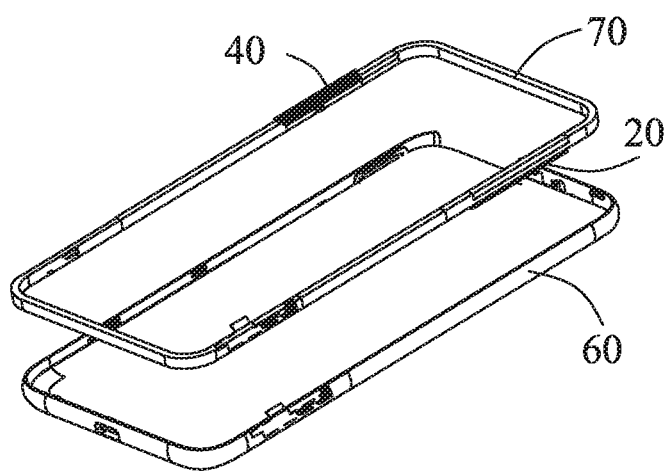
FIG. 3 is a schematic structural diagram of an adaptation of the housing of the mobile terminal and the antenna module.

Referring to FIG. 3, in some embodiments, the mobile terminal 100 further includes a bracket 70 arranged in the housing 60, and the second antenna group 20 and the fourth antenna group 40 are arranged on the bracket 70.

Referring to FIG. 3, in some embodiments, the mobile terminal 100 further includes a bracket 70 arranged in the housing 60. The second antenna group 20 and the fourth antenna group 40 are arranged on the bracket 70.

It can be understood that the arrangement of sub-antennas in the second antenna group 20 and the fourth antenna group 40 may also be such that a part of the antennas in the second antenna group 20 and the fourth antenna group 40 are arranged on the bracket 70, and the other part of the antennas are arranged on the inner surface of the housing 60.

That is, any one or more of the third antenna 201 and the fourth antenna 202 in the second antenna group 20, the sixth antenna 401 and the seventh antenna 402 in the fourth antenna group 40 are arranged on the bracket 70, and the remaining antennas are arranged on the inner surface of the housing 60.

The performance of the antenna module is shown in FIG. 4A to FIG. 6.

Figure 4A:
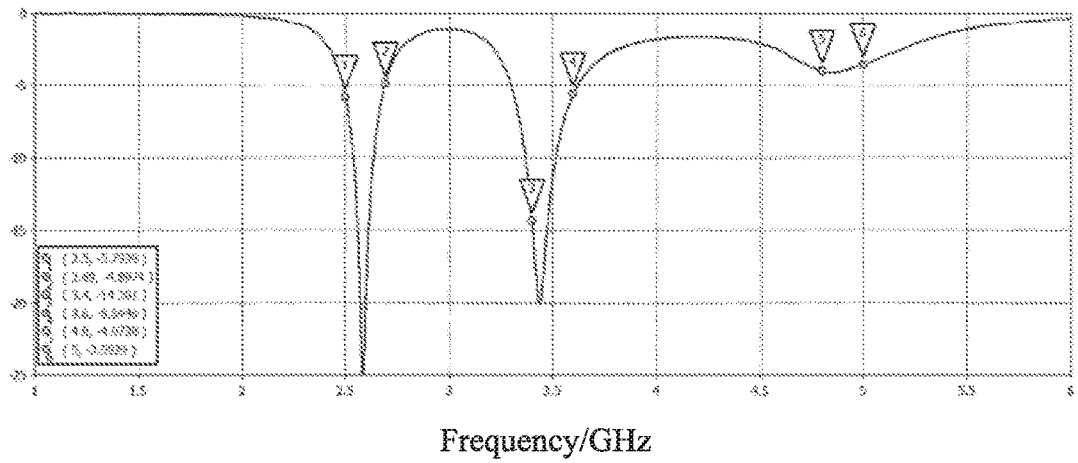
FIG. 4A is a reflection coefficient graph of a sixth antenna of the antenna module.

Herein, FIG. 4A is a reflection coefficient graph of the sixth antenna of the antenna module.

Figure 4B:
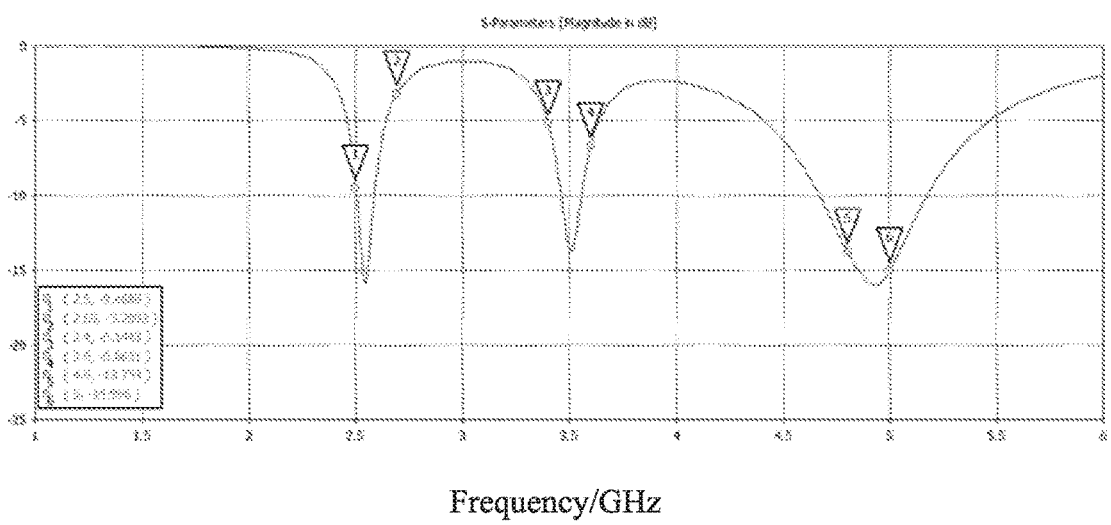
FIG. 4B is a reflection coefficient graph of a fourth antenna of the antenna module.

FIG. 4B is a reflection coefficient graph of the fourth antenna of the antenna module.

Figure 4C:
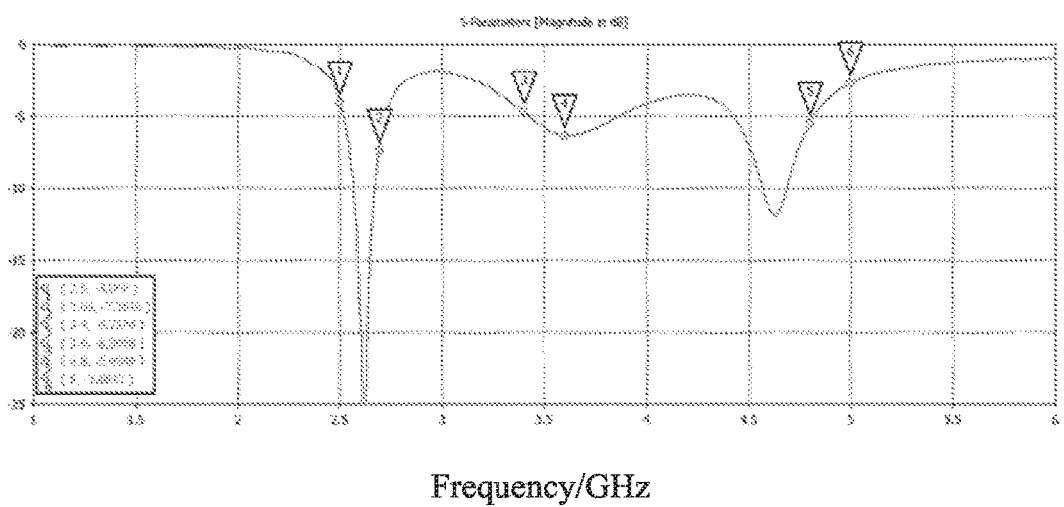
FIG. 4C is a reflection coefficient graph of a seventh antenna of the antenna module.

FIG. 4C is a reflection coefficient graph of the seventh antenna of the antenna module.

Figure 4D:
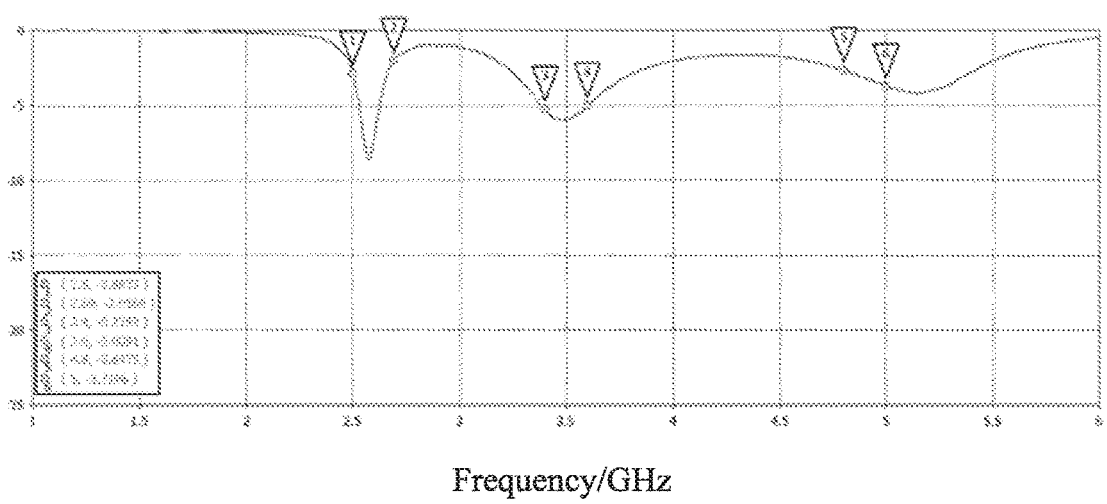
FIG. 4D is a reflection coefficient graph of a third antenna of the antenna module.

FIG. 4D is a reflection coefficient graph of the third antenna of the antenna module.

Figure 5A:
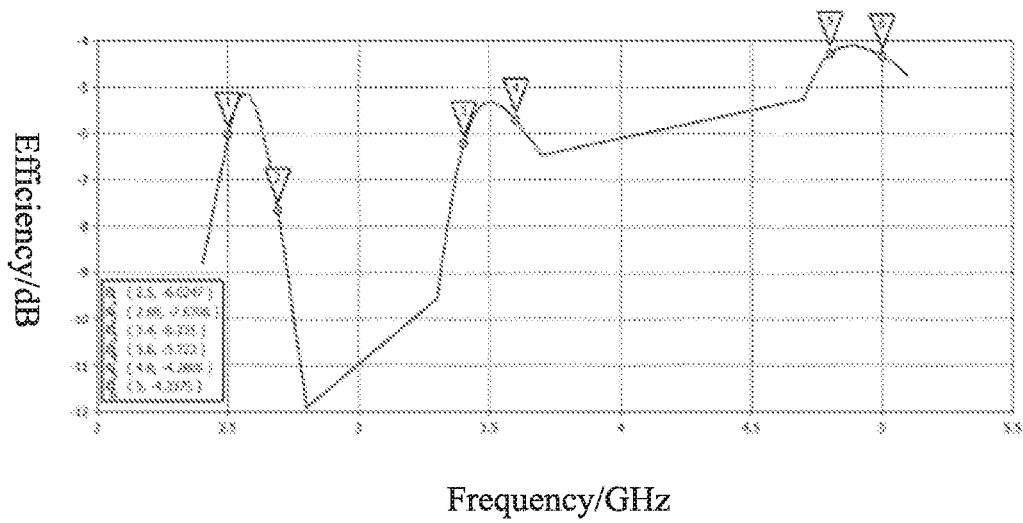
FIG. 5A is an efficiency graph of the sixth antenna of the antenna module.

FIG. 5A is an efficiency graph of the sixth antenna of the antenna module.

Figure 5B:
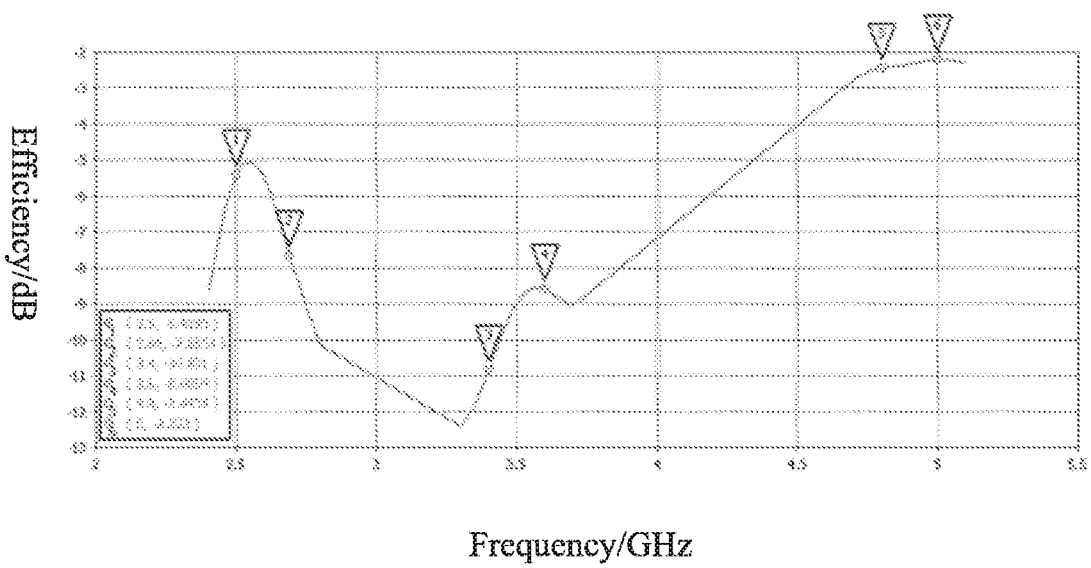
FIG. 5B is an efficiency graph of the fourth antenna of the antenna module.

FIG. 5B is an efficiency graph of the fourth antenna of the antenna module.

Figure 5C:
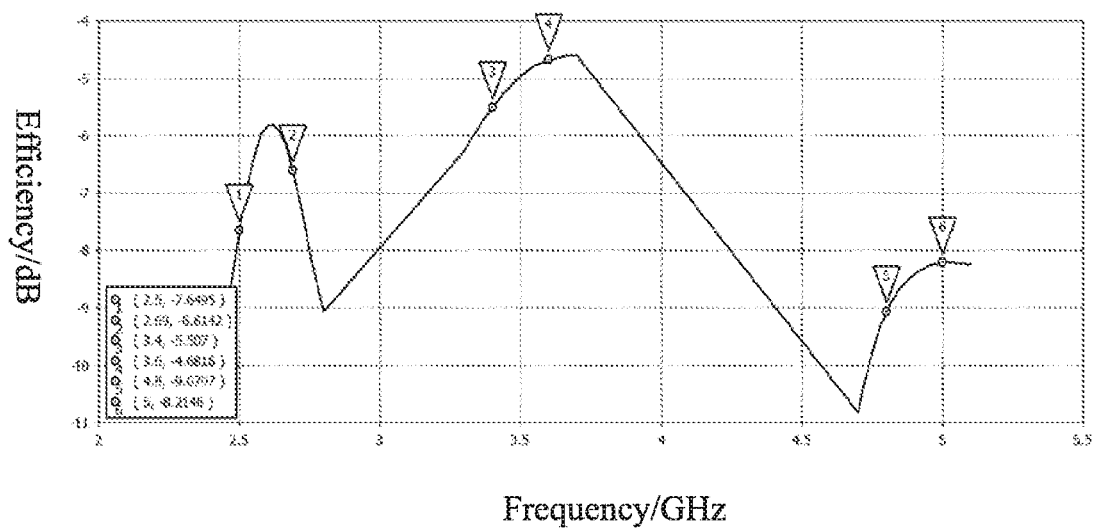
FIG. 5C is an efficiency graph of the seventh antenna of the antenna module.

FIG. 5C is an efficiency graph of the seventh antenna of the antenna module.

Figure 5D:
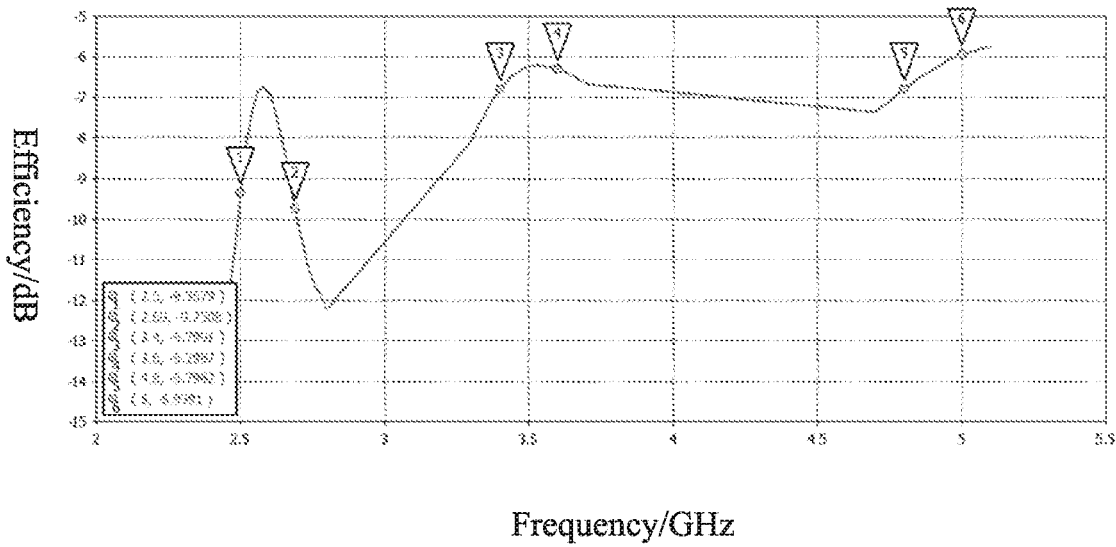
FIG. 5D is an efficiency graph of the third antenna of the antenna module.

FIG. 5D is an efficiency graph of the third antenna of the antenna module.

Figure 6:
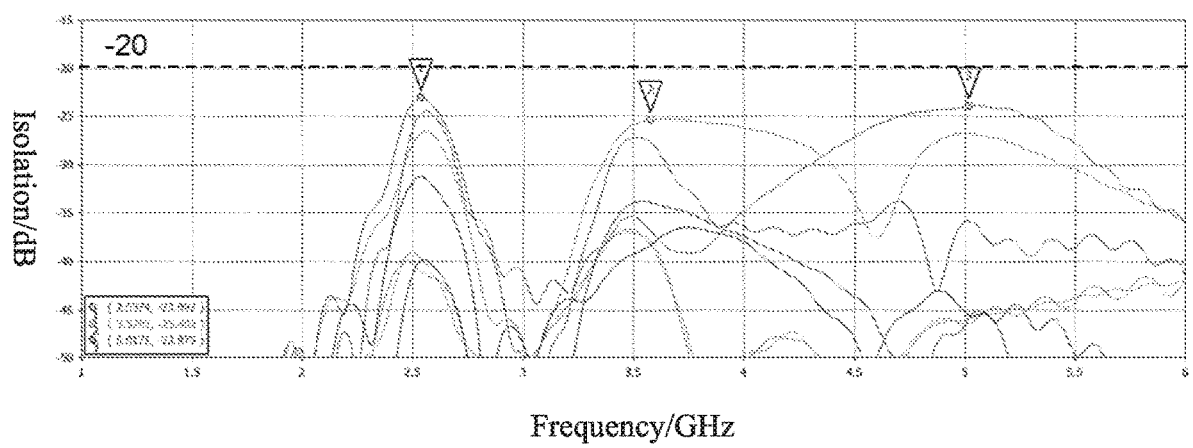
FIG. 6 is an isolation graph of the antenna module.

FIG. 6 is an isolation graph of the antenna module.

Compared with the existing technology, the antenna module and the mobile terminal provided in the present disclosure have the following advantages.

1. The antenna module is provided with the first antenna group, the second antenna group, the third antenna group and the fourth antenna group; the first antenna group and the third antenna group are respectively arranged on opposite sides of the housing in the first direction; the second antenna group and the fourth antenna group are respectively arranged on opposite sides of the housing in the second direction, and the first direction and the second direction are perpendicular to each other; the first antenna group includes the first antenna and the second antenna, where both the first antenna and the second antenna operate in the 4G frequency band; the second antenna group includes the third antenna and the fourth antenna, where both the third antenna and the fourth antenna operate in the 5G frequency band; the third antenna group includes the fifth antenna, and the fifth antenna operates in the 4G frequency band; the fourth antenna group includes the sixth antenna and the seventh antenna, where both the sixth antenna and the seventh antenna operate in the 5G frequency band; and the third antenna, the fourth antenna, the sixth antenna and the seventh antenna form the 4*4MIMO antenna group, thereby realizing compatibility of the sub-6 GHz frequency band on the basis that the antenna module does not affect the 4G frequency band, which makes communication performance of the mobile terminal better.

The above description is merely embodiments of the present disclosure. It should be noted that those of ordinary skills in the art may make improvements without departing from the inventive concept of the present disclosure, however, such improvements fall within the protection scope of the present disclosure.

What is claimed is:

1. A mobile terminal, provided with a housing and an antenna module, wherein the antenna module comprises a first antenna group, a second antenna group, a third antenna group and a fourth antenna group;

the first antenna group and the third antenna group are respectively arranged on opposite sides of the housing in a first direction;

the second antenna group and the fourth antenna group are respectively arranged on opposite sides of the housing in a second direction, and the first direction and the second direction are perpendicular to each other;

the first antenna group comprises a first antenna and a second antenna, wherein both the first antenna and the second antenna operate in a 4G frequency band;

the second antenna group comprises a third antenna and a fourth antenna, wherein both the third antenna and the fourth antenna operate in a 5G frequency band;

the third antenna group comprises a fifth antenna, and the fifth antenna operates in the 4G frequency band;

the fourth antenna group comprises a sixth antenna and a seventh antenna, wherein both the sixth antenna and the seventh antenna operate in the 5G frequency band; and the third antenna, the fourth antenna, the sixth antenna and the seventh antenna form a 4*4MIMO antenna group, wherein the mobile terminal further comprises a bracket arranged in the housing, and the second antenna group and the fourth antenna group are arranged on the bracket.

2. The mobile terminal according to claim 1, wherein an operating frequency band of the first antenna is 1.55~1.650 GHz, 2.4~2.5 GHz and 5.15~5.85 GHz, and an operating frequency band of the second antenna is 0.824~0.96 GHz and 1.71~2.69 GHz;

operating frequency bands of the third antenna, the fourth antenna, the sixth antenna and the seventh antenna are all 2.515~2.675 GHz, 3.4~3.6 GHz and 4.8~4.9 GHz; and an operating frequency band of the fifth antenna is 0.824~0.96 GHz and 1.71~2.69 GHz.

3. The mobile terminal according to claim 2, wherein the second antenna group and the fourth antenna group are arranged on an inner surface of the housing.

4. The mobile terminal according to claim 2, wherein the mobile terminal further comprises a bracket arranged in the housing, and a part of antennas in the second antenna group and the fourth antenna group are arranged on the bracket, and the other part of the antennas are arranged on an inner surface of the housing.

5. The mobile terminal according to claim 1, wherein one of the first antenna group and the third antenna group is arranged on a top of the housing and the other is arranged on a bottom of the housing;

the third antenna and the fourth antenna are arranged on one side of the housing at intervals, and the sixth antenna and the seventh antenna are arranged on the other side of the housing at intervals.

6. The mobile terminal according to claim 5, wherein the second antenna group and the fourth antenna group are arranged on an inner surface of the housing.

7. The mobile terminal according to claim 5, wherein the mobile terminal further comprises a bracket arranged in the housing, and a part of antennas in the second antenna group and the fourth antenna group are arranged on the bracket, and the other part of the antennas are arranged on an inner surface of the housing.

8. The mobile terminal according to claim 1, wherein the second antenna group and the fourth antenna group are arranged on an inner surface of the housing.

9. The mobile terminal according to claim 1, wherein the mobile terminal further comprises a bracket arranged in the housing, and a part of antennas in the second antenna group and the fourth antenna group are arranged on the bracket, and the other part of the antennas are arranged on an inner surface of the housing.

* * * * *